3,161,692
PREPARATION OF 1,1,3-TRIMETHYL-3-PHENYL-INDANES AND HEAT TRANSFER FLUIDS AND LUBRICANTS THEREFROM
Robert L. McLaughlin, Westfield, and John W. Schick, Merchantville, N.J., assignors to Socony Mobil Oil Company, Inc., a corporation of New York
No Drawing. Filed Oct. 10, 1961, Ser. No. 144,028
15 Claims. (Cl. 260—668)

This invention is concerned with the preparation of 1,1,3-trimethyl-3-phenylindane and homologues thereof. It is more particularly concerned with a novel catalytic process for preparing such materials by dimerizing and codimerizing α-methylstyrene and alkyl-substituted α-methylstyrenes. It is also concerned with heat transfer fluids and synthetic lubricants that are stable at elevated temperatures and which are resistant to atomic radiation.

As is well known to those familiar with the art, α-methylstyrene can be dimerized to form either the unsaturated, chain type dimer, or the saturated ring-type dimer, i.e., 1,1,3-trimethyl-3-phenylindane. It has been proposed to dimerize α-methylstyrene to the saturated dimer, in the presence of concentrated sulfuric acid. The process is disadvantageous because it requires a time-consuming operation to remove sulfuric acid from the product. The saturated dimer of alpha-methyl-p-methylstyrene has been prepared by reacting in the presence of fuller's earth, but relatively high catalyst activation temperatures are needed. It has also been taught that, at lower temperatures, fuller's earth catalyzes the production of the unsaturated chain-type dimer.

It has now been found that 1,1,3-trimethyl-3-phenylindane and its homologues can be produced simply and economically. It has been discovered that these compounds can be readily produced at low temperatures by dimerizing alpha-methylstyrene and/or lower alkyl-alpha-methylstyrene in the presence of certain solid, acidic catalysts, to wit, acid activated montmorillonite type clay, sulfuric acid on acid activated montmorillonite type clay, and synthetic silica-alumina.

As is also known to those familiar with the art, a heat transfer fluid must be stable at relatively high temperatures. In addition, if it is to be used under conditions of direct or indirect exposure to atomic radiation, it must be resistant to degradation therefrom. Thus, for example, in order to utilize atomic energy for power purposes, heat energy is transferred from the atomic reactor to a steam boiler. This is accomplished by pumping a heat exchange fluid, in indirect heat exchange relationship, through the reactor and then through the steam boiler. In order to be utilizable under these conditions, the heat transfer fluid must be stable under high temperature conditions and resist radiation bombardment. Many fluids may have one of the desired characteristics, but not both. The desideratum, however, is a heat transfer fluid that is resistant to heat and to radiation.

Jet combustion engines pose severe lubrication problems, particularly at high operating speeds. Above Mach 2, ram air temperatures increase to a point whereby the ram air cannot cool the oil. In addition, higher engine speed results in more heat rejected into the oil. Thus, the military requirements for lubricating engines for aircraft operated at Mach 3 speeds (MIL–L–9236B) call for a lubricant that will withstand temperatures up to about 400° F. It has been indicated that, in the Mach 3.5 to 4 speed range, oils will be required to withstand temperatures up to about 700° F.

Rockets, used in missiles and in space vehicles, require good lubrication. In these cases, the duration of high temperature performance is short. However, storage stability is necessary, because some rockets may remain on stand-by for several years.

There has now been found a class of materials that have the aforementioned desired properties for heat transfer fluids and lubricants and which can be used over a wide temperature range. It has been discovered that certain codimers of alpha-methylstyrene and alkyl-substituted alpha-methylstyrene are effective heat transfer fluids and synthetic lubricants that are resistant both to heat and to atomic radiation. It will be apparent, of course, that these materials are utilizable in various systems and are not restricted to use in the presence of atomic radiation.

Accordingly, it is a broad object of this invention to provide a process for producing 1,1,3-trimethyl-3-phenylindane and its homologues simply and economically. Another object is to provide novel heat transfer fluids and synthetic lubricants. A further object is to provide a novel catalytic process for dimerizing alpha-methylstyrene and/or mono-lower-alkyl-alpha-methylstyrene to the saturated, ring-type dimer. A further object is to provide heat transfer fluids and synthetic lubricants that can be used over a wide temperature range. A further object is to provide a method for effecting the dimerization to the saturated, ring-type dimer in the presence of acid activated montmorillonite type clay, sulfuric acid on activated montmorillonite type clay, or of synthetic silica-alumina. A further specific object is to provide novel codimers of alpha-methylstyrene and alkyl-substituted alpha-methylstyrene. Other objects and advantages of this invention will become apparent to those skilled in the art, from the following detailed description.

The present invention provides a process for producing 1,1,3-trimethyl-3-phenylindane and its homologues which comprises contacting at least one alpha-methylstyrene reactant selected from the group consisting of alpha-methylstyrene and mono-lower-alkyl-alpha-methylstyrene with a catalyst selected from the group consisting of acid activated montmorillonite type clay, 5–25 weight percent $H_2SO_4$ on acid activated montmorillonite type clay and synthetic silica-alumina, and at a temperature varying between about 100° C. and about 200° C.; the amount of catalyst being between about one percent and about 5 percent, by weight of the alpha-methylstyrene reactant.

Another embodiment of this invention provides novel heat transfer fluids and synthetic lubricants, which comprise the saturated codimer produced by contacting a reaction mixture of between about 50 mole percent and about 90 mole percent alpha-methylstyrene and between about 50 mole percent and about 10 mole percent mono-lower-alkyl-alpha-methylstyrene with a catalyst selected from the group consisting of acid activated montmorillonite type clay, 5–25 weight percent $H_2SO_4$ on acid activated montmorillonite type clay, and a synthetic composite of silica and alumina containing between about 7 weight percent and about 15 weight percent alumina, at a temperature varying betwen about 120° C. and about 200° C. and for a period of time varying between about 1 hour and about 10 hours; the amount of said catalyst used being between about one percent and about 10 percent, by weight, of said reaction mixture.

THE DIMERIZATION PROCESS

The charge materials that are dimerized in the process of this invention are alpha-methylstyrene and its derivatives having a lower alkyl group substituted on the ring. Non-limiting examples of the contemplated charge materials are alpha-methylstyrene, m-methyl-alpha-methylstyrene, p-methyl-alpha-methylstyrene, p-ethyl-alpha-methylstyrene, m-isopropyl-alpha-methylstyrene, and p-propyl-alpha-methylstyrene. Although it is preferable to use charge materials of relatively high purity, in the order of 90–99%, cruder charge materials can be used.

Thus, the process has been found operable with a material containing as little as 50 percent alpha-methylstyrene. In this case, the use of more catalyst (upwards of 2 percent) is recommended. The reaction is specific to the alpha-methylstyrene reactant and the remainder of the material serves as a diluent. The process is also applicable to produce codimers of alpha-methylstyrene with one or more mono-lower-alkyl-alpha-methylstyrenes.

The catalysts utilizable herein are acid activated montmorillonite type clay, sulfuric acid on acid activated montmorillonite type clay, and synthetic composites of silica and alumina. In the runs described hereinafter a non-swelling bentonite clay of the montmorillonite type which had been activated by acid treatment to give a composition

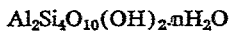

was used. This product is available in the activated state under the trade name "Super Filtrol." The acid activation treatment is well known to those skilled in the art and is described more or less in detail by B. A. Stagner in "The Science of Petroleum," volume III, page 1699 (Oxford Press) (1938). For the activation of small quantities of clay a similar treatment may be used. Thus, one kilogram of bentonite is boiled with 2,000 cubic centimeters of 17 percent sulfuric acid for three hours. The mixture is filtered and the clay washed with distilled water until the filtrate is substantially free from acid (0.2 to 0.5 percent acid). The clay is then dried to a moisture content of about 15 percent and ground to pass a 200-mesh screen. When the acid treated clay is washed with "hard" water after the acid is neutralized, the clay is injured by absorbing basic ions from the water.

When only a portion of the total extractable material is leached from the clay by the acid, the maximum activity is developed. The optimum concentration of the acid is about 15 percent to about 20 percent. Sulfuric and hydrochloric acids are the most economical to use although sulfuric acid is somewhat slower than hydrochloric.

Particularly in the case of relatively crude reactants, the acid treated montmorillonite type clay can be promoted with between about 5 percent and about 25 percent sulfuric acid ($H_2SO_4$). Such a catalyst is still a "dry" catalyst.

The other type of material found effective as a catalyst herein are synthetic composites of silica and alumina which are acidic in nature. Such composites will contain about 7 percent and about 15 percent, by weight, of alumina, the balance being substantially silica. There appears to be nothing critical about the manner in which these composites are prepared. They may be made by any of the usual methods well known to those skilled in the manufacture of catalysts. A feasible method for preparing the catalyst involves adding an aqueous acidic solution, containing the required amount of aluminum salt, to an aqueous solution of sodium silicate, thus precipitating the silica and alumina simultaneously. This type of operation can be carried out in accordance with the method known in U.S. Patent No. 2,384,946 to produce the catalyst in a hydrogel bead form.

The process of this invention involves a highly exothermic reaction. Accordingly, the reaction commences almost immediately upon contact between the catalyst and the charge material at room temperature. In order to ensure complete reaction, however, the reaction mixture is permitted to rise in temperature to temperatures varying between about 100° C. and about 200° C. The preferred operating temperature is between about 140° C. and about 150° C. Because the reaction is exothermic, it is ordinarily not necessary to supply heat to the reaction mixture from an extraneous source. Indeed, the reaction system usually must be supplied with a means of extracting heat from the reaction mixture in order to maintain the reaction temperature within the aforedescribed limits.

The process of this invention has been carried out by several methods. One method involves mixing the charge material and the catalyst at room temperature. The reaction starts immediately and causes the temperature to rise rapidly to 100 to 200° C. In this case temperature control is essential otherwise the reaction will become too violent. Another method involves adding catalyst operation-wise to an agitated charge material. The temperature begins to rise slowly to 100 to 125° C. when about 1 percent catalyst has been added. The temperature is then raised to 150° C. and held for 1 hour or more. This procedure although operable is less desirable because temperature control is less certain.

In the preferred batchwise method of operation, the catalyst is charged to a reactor that is provided with agitation. Then the charge material is added slowly. The temperature rises spontaneously to 100 to 125° C. and is permitted to rise further to about 150° C. or higher. Addition of charge material is continued at a rate which will maintain the reaction temperature at about 150° C. The rate of addition of charge material, therefore, is limited only by the ability to control reaction temperature. Thus, if the reactor is provided with a cooling means for extracting excess heat the charge material can be added rather rapidly while maintaining the reaction mixture at the desired temperature. In the absence of heat extracting means, it will be appreciated that the addition of charge material will be relatively slow. In order to ensure complete reaction, it is preferable to maintain the reaction mixture at about 150° C. for 1 hour or more after the addition of charge material has been completed.

The process is also adaptable to a continuous operation. In this operation a fixed bed of catalytic material is maintained and the charge material is passed through it. Generally, it is preferred to preheat the charge material to the temperatures in the order of about 100° C. before contacting it with the catalytic bed. As the charge material passes through the bed, the temperature will rise and the "hot zone" will gradually move from the upper portion to the lower portion of the bed. When this zone reaches the bottom of the catalyst bed continued addition of charge material will result in a gradual decrease of temperature, indicating a loss in catalytic activity. At this point, the catalyst bed will be replaced or regenerated.

The amount of catalyst that is used will vary between about 1 percent and about 10 percent of the charge material. Generally, between 1 percent and about 5 percent is preferable. In the case of less pure reactants, as mentioned hereinbefore upwards of 2 percent more catalyst is recommended.

The time of reaction does not appear to be a critical factor, because the reaction involved is relatively fast. The reaction time is limited primarily by the ability to remove or to utilize the heat of reaction. In batch operation it is generally preferred to continue contact between the catalyst and charge material for at least an hour after addition of charge material has been completed.

If desired, the reaction can be carried out in the presence of an inert non-polar solvent which does not by itself enter into the reaction. Such solvents include benzene, toluene, xylene and the like. In general, the use of solvents will permit an easier control of the reaction temperature. The usual practice in using a solvent is to slurry the catalyst in solvent and add reactant thereto. However, some or all the solvent can be used to dilute the reactant.

The reaction product is recovered relatively simply. The reaction mixture is cooled and filtered to remove catalyst. Then if solvent is used, it is removed by atmospheric topping distillation. Finally, the product itself can be vacuum distilled. In general, very little if any unreacted charge material is found in the low boiling cut. Impurities in the less pure charge materials are removed at this stage. The product dimer can then be distilled and it will be found that a small amount of higher polymers will be present. In the case of 1,1,3-trimethyl-3-phenylindane, the product boils at about 600° F. at atmospheric pressure. The materials produced by the process of this invention are utilizable as heat transfer media and as plasticizers for vinyl resins. Accordingly, in many applications it will not be necessary to separate the dimer product from the small amounts of higher boiling polymers. Thus, the entire product after removal of solvent can be used.

The following specific examples are for the purpose of illustrating the process of this invention. It is to be strictly understood that the process is not to be limited by the specific charge materials and catalysts utilized herein or by the operations and manipulations involved. As will be appreciated by those skilled in the art, other reactants and catalysts can be used as has been disclosed hereinbefore.

As has been mentioned hereinbefore, a feasible method of operation batchwise is to add the alpha-methylstyrene reactant with or without a solvent dropwise to the catalyst. This is illustrated in the following runs.

Examples 1 Through 3

Three runs were made in which alpha-methylstyrene was added dropwise to acid activated montmorillonite type clay sold under the trade name "Super Filtrol." In each run the ratio of catalyst to alpha-methylstyrene was varied and the rate of addition was adjusted to maintain the reaction at about 150° C. Pertinent data and results are set forth in Table I.

Examples 4 and 5

Using the procedure described in Examples 1 through 3, two additional runs with alpha-methylstyrene were made. In these runs, however, the catalyst was a bead-form silica-alumina cracking catalyst containing about 10 percent alumina by weight. Pertinent data and results of these runs are also set forth in Table I.

It is also feasible to carry out the process of this invention using a solvent. As has been mentioned hereinbefore the solvent can be a non-polar aromatic solvent. It is, however, also possible to use dimer product itself as a diluent.

Examples 6 Through 9

Four runs were carried out wherein 99% pure alpha-methylstyrene was added dropwise to a slurry of "Super Filtrol" and a xylene solvent. In each run, the amount of catalyst was varied slightly and the temperature of reaction was varied. Pertinent process data and results are set forth in Table II.

Example 10

A slurry of saturated dimer product (1,1,3-trimethyl-3-phenylindane) and Super Filtrol catalyst was prepared. Then 99% pure alpha-methylstyrene was added dropwise. Pertinent process data and results are set forth in Table II.

Example 11

A slurry of saturated dimer product bead-form silica-alumina catalyst containing about 10 percent alumina was prepared. Then, 99% pure alpha-methylstyrene was added dropwise. Pertinent process data and results are set forth in Table II.

The preceding examples illustrative of the process of this invention are applied to batch operation on alpha-methylstyrene. The operation is also effective on methyl substituted derivatives of alpha-methylstyrene, as will be apparent from the following examples.

Examples 12 and 13

Two runs were made using a charge material comprising a 98% pure mixture of m-methyl-alpha-methylstyrene and p-methyl-alpha-methylstyrene. Slurried in xylene solvent, the catalyst for each run was Super Filtrol. Pertinent process conditions and results are also set forth in Table II.

TABLE I

| Example | Catalyst | Grams | Percent on charge | α-Methylstyrene Purity, percent | α-Methylstyrene Charge, grams | Temperature, °C. | Time, hours | Dimer Grams | Dimer Percent yield | Higher polymer Grams | Higher polymer Percent yield | Total, percent yield |
|---|---|---|---|---|---|---|---|---|---|---|---|---|
| 1 | Filtrol | 10 | 1 | 90-95 | 1,000 | 150 | 2 | 721 | 76 | 116 | 12 | 88 |
| 2 | do | 50 | 1.7 | 99 | 3,000 | 150 | 5 | 2,722 | 91 | 180 | 6 | 97 |
| 3 | do | 100 | 4 | 99 | 2,500 | 150 | 4 | 2,323 | 94 | 115 | 5 | 99 |
| 4 | Silica-alumina | 10 | 1 | 90-95 | 1,000 | 150 | 4 | 761 | 80 | 60 | 6 | 86 |
| 5 | do | 5 | 1 | 90-95 | 500 | 150 | 3 | 402 | 85 | 19 | 4 | 89 |

TABLE II

| Example | Catalyst | Grams | Solvent | Grams | Charge, grams | Temperature, °C. | Time, hours | Dimer Grams | Dimer Percent yield | Higher Polymer Grams | Higher Polymer Percent yield | Total, percent yield |
|---|---|---|---|---|---|---|---|---|---|---|---|---|
| 6 | Filtrol | 10 | Xylene | 500 | 200 | 100 | 5 | 155 | 78 | 9 | 5 | 83 |
| 7 | do | 10 | do | 1,000 | 222 | 140 | 2 | 206 | 94 | 3 | 1 | 95 |
| 8 | do | 25 | do | 1,000 | 236 | 140 | 3 | 219 | 94 | 11 | 5 | 99 |
| 9 | do | 25 | do | 200 | 1,000 | 150 | 4 | 881 | 89 | 90 | 9 | 98 |
| 10 | do | 25 | Dimer | 200 | 1,000 | 150 | 3 | 912 | 92 | 34 | 3 | 95 |
| 11 | Silica-alumina | 25 | do | 200 | 1,000 | 150 | 3 | 911 | 92 | 28 | 3 | 95 |
| 12 | Filtrol | 8 | Xylene | 200 | 419 | 160 | 2 | 367 | 88 | 13 | 3 | 91 |
| 13 | do | 5 | do | 175 | 175 | 150 | 2 | 166 | 95 | 4 | 2 | 97 |

From the data set forth in Table I it will be appreciated that the reaction proceeds to high yields of the desired saturated dimer, 1,1,3-trimethyl-3-phenylindane. It will be noted that silica-alumina catalyst effects a somewhat higher ratio of dimer to higher polymer at lower catalyst concentration.

From the data set forth in Table II it will be apparent that the process of this invention is as applicable to methyl-substituted (lower alkyl) derivatives as to alpha-methylstyrene itself.

As has been mentioned hereinbefore a feasible method for carrying out the process of this invention is to use a continuous operation. This type of operation is illustrated in the following example.

*Example 14*

The reactor for this run was a tube having an internal diameter of ⅞". Into this tube was placed a packed bed, 15" in height, of bead-form silica-alumina cracking catalyst containing 10 percent alumina. The total weight of the bed was 97.5 grams. A solution of 3,150 grams of 99 percent pure alpha-methylstyrene and 3,150 grams of xylene was preheated to 100° C. The preheated charge was then passed downwardly through the catalyst bed at a flow rate of about 400 cc. per hour. The heat of reaction in the catalyst bed maintained a reaction temperature of about 154° C. A total of 98.4 percent of the alpha-methylstyrene was converted; 3,000 grams (96 percent yield) of the product being a saturated dimer (1,1,3-trimethyl-3-phenylindane), and a total of 75 grams (2.4 percent) being higher polymer material.

For identification purposes, samples of typical products made by the process of this invention were subjected to analysis. Typical analytical data are set forth in Table III.

TABLE III

| | Dimer from— | | |
|---|---|---|---|
| | α-Methyl-styrene | p-Methyl-α-Methyl-styrene | m/p-Methyl-α-Methyl-styrene |
| Density (g./cc.) 68° F | 0.9607 | 0.9856 | 0.9850 |
| Pour Point, ° F | | | 15 |
| Freezing Point, ° F | 127 | 25 | |
| Viscosity (cs) 100° F | 8.3 | 88.3 | 78.3 |
| Viscosity (cs) 210° F | 2.6 | 4.3 | 4.3 |

As has been mentioned hereinbefore the products produced by the present process are useful as heat transfer media and as vinyl plasticizers. From the data in Table III, however, it will be noted that the freezing point of the alpha-methylstyrene dimer is relatively high so that the material is a crystalline solid at room temperatures. Accordingly, if this material is used as a heat transfer media, it will be used for conditions of tempearture above 127° F. Otherwise, it must be blended with other materials, such as the normally liquid dimer described in Example 12, in order to lower the freezing point. On the other hand, the materials produced by the process of this invention are advantageous in that they can be used at high temperatures before it is necessary to pressurize the heat exchange system. Thus, the alpha-methylstyrene dimer boils at about 600° F., higher than most conventional heat transfer fluids. Because of its normally crystalline form, the saturated dimer of alpha-methylstyrene tends to give a relatively rigid sheet when it is used as a plasticizer for polyvinyl chloride. A resin of this type, however, can be utilizable where rigid or slight rigid structures are desired, such as, for example, in fabricating rigid tubing or pipes.

HEAT TRANSFER FLUIDS AND SYNTHETIC LUBRICANTS

As mentioned hereinbefore, an embodiment of this invention involves certain saturated, cyclic codimers of alpha-methylstyrene and lower-alkyl-substituted alpha-methylstyrenes. These are extremely stable fluids useful as heat transfer fluids and synthetic lubricants. The codimers contemplated herein are produced by the process described hereinbefore, using the aforedescribed catalysts, charge materials, and process conditions and techniques. In order to produce liquid codimers that are effective heat transfer fluids and synthetic lubricants, the relative amounts of the monomers must be controlled.

The relative proportions of the two reactants in the reaction mixture used to prepare the codimers of this invention is quite important. From the standpoint of obtaining the best balance of properties in the product, i.e., the melting point, viscosity, and oxidative stability, it is desirable to hold the ratio of alpha-methylstyrene to ring-substituted alpha-methylstyrene as high as possible. The charge composition of around 80 mole percent alpha-methylstyrene and around 20 mole percent monoalkyl alpha-methylstyrene is the most desirable. As the amount of alpha-methylstyrene is increased above 80 mole percent there may be some tendency for crystals to separate out when the material is at room temperature. In general, however, it is possible to use as much as 90 percent mole percent alpha-methylstyrene. Upon decreasing the mole percent of alpha-methylstyrene below 80, the product has lower melting points but viscosities of the products will increase. In general, therefore, it is undesirable to decrease the amount of alpha-methylstyrene substantially below about 50 mole percent. Accordingly, the amount of alpha-methylstyrene in the reaction mixture will vary between about 50 mole percent and about 90 mole percent, the balance of the reaction mixture being mono-lower-alkyl alpha-methylstyrene. In preferred practice, the amount of alpha-methylstyrene will vary between about 75 mole percent and about 85 mole percent.

The following specific examples are for the purpose of illustrating the novel codimers of this invention and of illustrating the effectiveness thereof. It must be strictly understood that the invention is not to be limited to the specific reactants and conditions set forth in the examples or to the operations and manipulations involved. A wide variety of other reactants and conditions can be used as is set forth in the specification hereinbefore, as those skilled in the art will readily appreciate.

*Example 15*

Into a reaction vessel provided with efficient agitation there were added 60 grams of a solid catalyst comprising 20 weight percent $H_2SO_4$ supported on acid-treated clay of montmorillonite type (Super Filtrol). Then, a reaction mixture was prepared containing 1670 grams of 98 percent pure alpha-methylstyrene (76 mole percent), and 770 grams of 76 percent pure p-methyl-alpha-methylstyrene (24 mole percent).

The other component in the 76 percent pure p-methyl-alpha-methylstyrene is the saturated material, p-methyl-isopropylbenzene. It is unreacted and is removed in subsequent topping distillation. This reaction mixture was added slowly to the reaction vessel in contact with the catalyst at a rate to maintain the temperature of the reaction mixture at 150° C. The time of addition required was about 7 hours. After the reaction was completed the reaction mixture was cooled and filtered to remove the catalyst. A small amount of unreacted monomer and the saturated p-methyl-isopropylbenzene were removed by topping under reduced pressure. The product isolated by distillation weighed 2117 grams, i.e., 95 percent yield. There was about 4 percent yield of higher boiling polymer material. This codimer product had a density (g. per cc.), 68° F. of 0.9893; a pour point of −5° F.; and viscosities of 21.4 centistokes at 100° F. and 2.8 centistokes at 210° F.

This material was subjected to an analysis by high mass spectroscopy and showed the following composition; 46.6 weight percent dimer of alpha-methylstyrene (Structure A), 44.6 weight percent mixture of codimers (Structures B and C) and 8.8 weight percent dimer of dimethylstyrene (Structure D). This is typical of the distribution of the compositions of this invention.

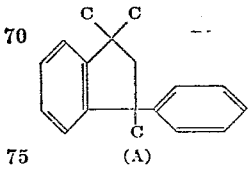

(A)

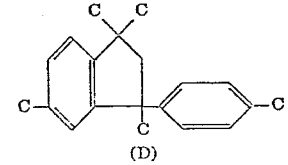

(D)

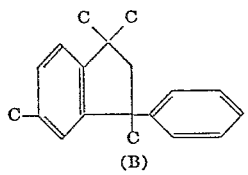

(B)

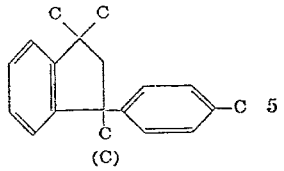

(C)

The products of Examples 15 through 21 have excellent properties of low pour point (enabling use at low temperatures) and low viscosity in the range of light lubricating oil (enabling easier pumping of the fluids). This will be apparent from the following tabulation of typical analyses of the codimer products.

TABLE V
*Properties of Codimers of α-Methylstyrene*

| | Codimer of α-Methylstyrene and— | | | | | | |
|---|---|---|---|---|---|---|---|
| | p-Methyl-α-Methylstyrene | | | | m/p-Methyl-α-Methylstyrene | m-Isopropyl-α-Methylstyrene | |
| Example No. | 15 | 16 | 17 | 18 | 19 | 20 | 21 |
| Mole Percent of α-Methylstyrene | 76 | 80 | 86 | 90 | 86 | 80 | 89 |
| Density (g./cc.), 68°F | 0.9893 | 0.9923 | 0.9906 | 0.9958 | 0.9965 | 0.9904 | 0.9992 |
| Pour Point, °F | −5 | −5 | −15 | −15 | −5 | −10 | −15 |
| Viscosity (cs), 100° F | 21.4 | 20.7 | 20.0 | 18.2 | 18.7 | 22.9 | 21.7 |
| Viscosity (cs), 210° F | 2.8 | 2.8 | 2.8 | 2.7 | 2.7 | 3.0 | 2.9 |

Examples 16, 17 and 18

Three runs were made using a reaction mixture of various molar amounts of alpha-methylstyrene and p-methyl-alpha-methylstyrene in contact with an acid activated montmorillonite type clay (Super Filtrol). Pertinent process conditions and product data are set forth in Table IV.

Example 19

A codimer product was produced by contacting a mixture of alpha-methylstyrene and mixed meta- and para-methyl-alpha-methylstyrene with an acid-treated montmorillonite type clay (Super Filtrol). Pertinent process conditions and product data are set forth in Table IV.

Examples 20 and 21

Two runs were made contacting a reaction mixture of alpha-methylstyrene and m-isopropyl-alpha-methylstyrene in varying molar amounts with an acid treated montmorillonite type clay (Super Filtrol). Pertinent process conditions and product data are set forth in Table IV.

In order to characterize further the efficiency of the products of this invention as heat transfer fluids and as lubricants under relatively severe conditions, the product of Example 15 was further tested for stability to oxidation, for high temperature stability, and for resistance to radiation. As will be apparent from the following test data, the codimers have many valuable properties.

Oxidative Stability

A sample of the product of Example 15 was exposed to a High Temperature Thin Film Oxidation Test. This test involves exposing a test liquid to oxidizing conditions in a thin film in a molecular still, using a disc of greater than 99.9 percent pure aluminum. The test, involving 12 oxidizing cycles, was carried out at 550° F. with an exposure time of 15 seconds and a liquid film thickness of 0.0003 to 0.0005 inch. The oxidizing gas was dry air. For comparison, a Mid-Continent distillate lube oil, such as is used in premium grade lubricants, was also subjected to this test. Pertinent results are set forth in Table VI.

TABLE IV
*Codimerization of α-Methylstyrene*

| Example No. | Comonomer 2 | Purity, Percent | Charge, g. | Conomer 1 α-Methylstyrene | | Mole Percent α MeS | Mole Ratio 1:2 | Reaction Conditions | |
|---|---|---|---|---|---|---|---|---|---|
| | | | | Purity, Percent | Charge, g. | | | Filtrol Catalyst, g. | Solvent Xylene, g. |
| 16 | p-Methyl-α-Methylstyrene | 60 | 73 | 98+ | 158 | 80 | 4:1 | 20 | 200 |
| 17 | do | 60 | 73 | 98+ | 233 | 86 | 6:1 | 20 | 200 |
| 18 | do | 60 | 37 | 98+ | 180 | 90 | 9:1 | 20 | 200 |
| 19 | m/p-Methyl-α-Methylstyrene | 98+ | 33 | 98+ | 180 | 86 | 6:1 | 15 | 200 |
| 20 | m-Isopropyl-α-Methylstyrene | 98 | 40 | 98+ | 120 | 80 | 4:1 | 15 | 100 |
| 21 | do | 98 | 40 | 98+ | 240 | 89 | 8:1 | 20 | 200 |

| Example No. | Comonomer 2 | Reaction Conditions | | Codimer | | Higher Boiler | | Total Yield, Percent |
|---|---|---|---|---|---|---|---|---|
| | | Temp., °C. | Time, hrs. | Grams | Yield, Percent | Grams | Yield, Percent | |
| 16 | p-Methyl-α-Methylstyrene | 150 | 3 | 194 | 96 | 9 | 4 | 100 |
| 17 | do | 150 | 3 | 264 | 95 | 9 | 4 | 99 |
| 18 | do | 150 | 3 | 193 | 96 | 8 | 3 | 99 |
| 19 | m/p-Methyl-α-Methylstyrene | 150 | 3 | 195 | 92 | 12 | 5 | 97 |
| 20 | m-Isopropyl-α-Methylstyrene | 135 | 3 | 113 | 71 | 26 | 16 | 87 |
| 21 | do | 150 | 3 | 192 | 69 | 54 | 19 | 88 |

TABLE VI

| Sample | Oxidation Rate, ml. $O_2$ per 5 min. | Cleanliness Rating | Percent Distilled | N.N. of Residue | N.N. of Distillate | Initial Vis. at 210°(cs) | Percent Vis. Inc. of Residue |
|---|---|---|---|---|---|---|---|
| Example 15 | 13 | 86 | 28 | 0.11 | 0.10 | 2.79 | 1.8 |
| Lube Oil | 110 | 68 | 40 | 1.1 | 0.64 | 4.80 | 9.4 |

In the Thin Film Oxidation Test, a minor part of the sample is lost from the recycle system as fog. This is collected separately and reported as "Distillate" and the remaining material as "Residue." The cleanliness rating is on the basis that no lacquer or tarnish on the disc is rated 100 and complete coverage with a heavy rough deposit is rated zero. From the lower N.N. (Neutralization Number=mg. KOH to neutralize one gram sample), the reduced viscosity increase, low oxygen consumption, and high cleanliness rating, it will be readily apparent that the codimers of this invention are quite resistant to oxidation at high temperatures.

High Temperature Stability

Another criterion of the stability of the heat transfer fluid and lubricant was obtained by long term refluxing. A 1500 cc. sample of the product of Example 15 was placed in a glass reactor containing a wad of steel wool (about 1.5 g.). The material in the reactor was heated at reflux temperature, about 600° F., for 1,000 hours. At 250-hour intervals, a sample was withdrawn and checked for viscosity. After 1,000 hours, the test material was checked for several characteristics and properties, including viscosity and compared with the initial material. It was found that there was no viscosity change throughout the 1,000-hour recycle period and that other properties changed as set forth in Table VII.

TABLE VII

| Property | Product Example 15 | |
|---|---|---|
| | Initial | After 1,000 hrs. |
| Flash, COC, °F | 285 | 285 |
| Pour Point, °F | −5 | <10 |
| Viscosity, SUS at 100° F | 106 | 106 |
| Viscosity, SUS at 210° F | 35 | |
| Aniline Point, °F | 67.6 | |
| Pentane Insoluble, Vol. percent | Nil | <0.1 |
| Conradson Carbon, Wt. percent | Nil | 0.06 |
| ASTM Distillation, °F.: | | |
| I.B.P | 575 | 575 |
| 5% | 585 | 580 |
| 10% | 590 | 590 |
| 20% | 590 | |
| 50% | 594 | |
| 80% | 596 | |
| 90% | 602 | |
| 95% | 610 | |
| E.B.P | 624 | |

From the data in Table VII it will be apparent that the codimer of this invention was virtually unchanged after the 1,000-hour heat treatment. This readily evidences the ability of these materials to undergo prolonged usage in a heat transfer system, at high temperatures, without degradation. Another significant factor to be noted in Table VII are the viscosity characteristics. The heat transfer fluids contemplated herein have the characteristics of light lubricating oil. Accordingly, the heat transfer fluids are readily pumpable, so that material savings in pumping costs are obtainable. Furthermore, the fluid itself can aid in the lubrication of the pumps and is highly useful as a lubricant in jet aircraft and rockets.

Radiation Resistance

As has been mentioned hereinbefore, the fluids of this invention are resistant to radiation damage. Accordingly, they are applicable for use in cases in which radiation can be a problem, such as atomic energy installations and in ventures into outer space.

A 50 g. sample of the product of Example 15 was exposed to Beta radiation. The sample was irradiated while being agitated in a dish of about 70 mm. diameter, with a liquid thickness of ½ in., and under a helium atmosphere. The exposure was for 90 minutes at a dose rate of $1.22 \times 10^{22}$ e.v./min., amounting to a total dosage of $3.55 \times 10^{10}$ ergs/gram. The cell temperature was about 320° F. The initial viscosities were 2.79 cs. (centistokes) at 210° F. and 21.38 cs. at 100° F. After radiation, the viscosities were 3.26 cs. at 210° F. and 30.09 cs. at 100° F. It was determined that, during radiation, there were evolved 0.126 molecule of $H_2$ and 0.042 molecule of methane per 100 e.v. of absorbed energy. It will be apparent therefore that the fluids of this invention do have resistance to radiation.

Heat transfer as contemplated herein is concerned with those processes wherein a fluid medium is circulated in a closed system, sometimes under pressure. In practice, a fluid heat transfer medium is continuously circulated in a closed cycle and heat is applied to the heat transfer medium in one portion of the cycle and useful heat is removed from the heat transfer medium in another portion of the cycle. Fluid temperatures ranging from ambient temperatures up to about 600° F. are contemplated. In one application, heat can be applied to the heat transfer fluid by means of a fired furnace or other suitable heating means, and the heat can then be transferred via circulating the heat transfer medium to a heat removal means which can take many forms, such as a heating jacket of an autoclave, heating coils within a reactor, etc. In a typical automic energy installation heat would be applied from an atomic reactor and carried to a boiler for generation of steam. The heat transfer cycle can also be in the other direction. Thus, for example, a product stream could be cooled by indirect heat exchange with a cooled heat transfer fluid, which is then contacted with a heat removal means, e.g., refrigeration, in order to cool it for recycle in the heat transfer cycle.

In order to further characterize the lubricating properties of the codimer fluid, a portion of the product of Example 15 was subjected to the Shell Four-Ball Test. For comparison, a Mid-Continent distillate mineral lubricating oil was also subjected to this test. Pertinent data are set forth in Table VIII. The Four-Ball Wear Test was run as described in U.S. Military Specification MIL–G–25760A (14 September 1960) except the test was run at 600 r.p.m. for 30 minutes.

TABLE VIII

Test Conditions

| | | |
|---|---|---|
| Predent | kg | 60 |
| Test load | kg | 40 |
| Temperature | °F | 200 |
| Speed | r.p.m | 600 |
| Duration | minutes | 30 |

| | Example 15 | | Lube Oil | |
|---|---|---|---|---|
| Scar Diameter, mm.: | | | | |
| Predent | 0.3700 | 0.3600 | 0.3650 | 0.3575 |
| Final | 0.7075 | 0.6450 | 0.8600 | 0.9500 |
| Wear | 0.3375 | 0.2850 | 0.4950 | 0.5925 |

This application is a continuation-in-part of copending application Serial No. 803,080, filed March 31, 1959 now allowed, directed to a process, and includes the subject matter of copending application Serial No. 803,070, filed March 31, 1959, directed to specific products of the process set forth in Serial No. 803,080.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing 1,1,3-trimethyl-3-phenylindane and homologues thereof, which comprises contacting at least one alpha-methylstyrene reactant selected from the group consisting of alpha-methylstyrene and mono-lower-alkyl-alpha-methylstyrene with a catalyst selected from the group consisting of acid activated montmorillonite type clay and synthetic silica-alumina containing between about 7 percent and about 15 percent alumina by weight, and at a temperature varying between about 140° C. and about 150° C.; the amount of said catalyst being between about one percent and about 10 percent, by weight of said alpha-methylstyrene reactant.

2. The process defined in claim 1 wherein said catalyst is slurried in a non-polar solvent.

3. A process for the production of 1,1,3-trimethyl-3-phenylindane, which comprises contacting alpha-methylstyrene with between about one percent and about 5 percent, by weight of said alpha-methylstyrene, of acid activated montmorillonite type clay, and at a temperature varying between about 140° C. and about 150° C.

4. The process defined in claim 3 wherein said acid activated montmorillonite type clay is slurried in a xylene solvent.

5. The process defined in claim 3 wherein said acid activated montmorillonite type clay is slurried in 1,1,3-trimethyl-3-phenylindane, as the solvent.

6. A process for the production of 1,1,3-trimethyl-3-phenylindane which comprises contacting alpha-methylstyrene with between about one percent and about 5 percent, by weight of said alpha-methylstyrene, of synthetic silica-alumina containing between about 7 percent and about 15 percent alumina by weight, and at a temperature varying between about 140° C. and about 150° C.

7. The process defined in claim 6 wherein said synthetic silica-alumina is slurried in a xylene solvent.

8. A process for the production of 1,1,3-trimethyl-3-tolylindane which comprises contacting mixed meta- and para-methyl-alpha-methylstyrene with between about one percent and about 5 percent, by weight of said mixed meta- and para-methyl-alpha-methylstyrene, of acid activated montmorillonite type clay, and at a temperature varying between about 140° C. and about 150° C.

9. The process defined in claim 8 wherein said acid activated montmorillonite type clay is slurried in a xylene solvent.

10. A continuous process for producing 1,1,3-trimethyl-3-phenylindane and homologues thereof which comprises establishing a static bed of a catalyst selected from the group consisting of acid activated montmorillonite type clay and synthetic silica-alumina containing between about 7 percent and about 15 percent alumina by weight, preheating an alpha-methylstyrene reactant to a temperature of the order of about 100° C., passing said preheated alpha-methylstyrene reactant downwardly through said static bed of catalyst at a flow rate to maintain the temperature of reaction at about 150° C., and recovering 1,1,3 - trimethyl - 3 - phenylindane and homologues thereof from the effluent.

11. A continuous process for producing 1,1,3-trimethyl-3-phenylindane which comprises establishing a static bed of acid activated montmorillonite type clay, preheating alpha-methylstyrene in xylene solvent to a temperature of about 150° C., passing said preheated alpha-methylstyrene and xylene downwardly through said static bed, at a flow rate of about 400 cubic centimeters per hour when the diameter of said static bed is about ⅞ inch in diameter, and recovering 1,1,3-trimethyl-3-phenylindane from the effluent.

12. The saturated codimer having a substituted indane structure produced by contacting a reaction mixture containing between about 50 mole percent and about 90 mole percent alpha-methylstyrene and between about 50 mole percent and about 10 mole percent mono-lower-alkyl-alpha-methylstyrene with a catalyst selected from the group consisting of acid activated montmorillonite type clay, between about 5 weight percent and about 25 weight percent $H_2SO_4$ supported on acid activated montmorillonite type clay, and a synthetic composite of silica and alumina containing between about 7 weight percent and about 15 weight percent alumina, at a temperature varying between about 120° C. and about 200° C., the amount of said catalyst used being between about one percent and about 10 percent, by weight of said reaction mixture.

13. The saturated codimer having a substituted indane structure produced by contacting a reaction mixture containing between about 75 mole percent and about 85 mole percent alpha-methylstyrene and between about 25 mole percent and about 15 mole percent para-methyl-alpha-methylstyrene with between about one percent and about 10 percent, by weight of said reaction mixture, of a catalyst selected from the group consisting of acid activated montmorillonite type clay, between about 5 weight percent and about 25 weight percent $H_2SO_4$ supported on acid activated montmorillonite type clay, and a synthetic composite of silica and alumina containing between about 7 weight percent and about 15 weight percent alumina, at a temperature varying between about 140° C. and about 150° C.

14. The saturated codimer having a substituted indane structure produced by contacting a reaction mixture containing between about 75 mole percent and about 85 mole percent alpha-methylstyrene and between about 25 mole percent and about 15 mole percent of mixed meta- and para-methyl-alpha-methylstyrene with between about one percent and about 10 percent, by weight of said reaction mixture, of an acid activated montmorillonite type clay, at a temperature varying between about 140° C. and about 150° C.

15. The saturated codimer having a substituted indane structure produced by contacting a reaction mixture containing between about 75 mole percent and about 85 mole percent alpha-methylstyrene and between about 25 mole percent and about 15 mole percent meta-isopropyl-alpha-methylstyrene with between about one percent and about 10 percent, by weight of said reaction mixture, of an acid activated montmorillonite type clay, at a temperature varying between about 140° C. and about 150° C.

References Cited in the file of this patent

UNITED STATES PATENTS

| | | |
|---|---|---|
| 2,270,717 | Shipp et al. | Jan. 20, 1942 |
| 2,340,724 | Zur Horst et al. | Feb. 1, 1944 |
| 2,433,372 | Kress | Dec. 30, 1947 |
| 2,450,027 | Warner et al. | Sept. 28, 1948 |
| 2,497,929 | Cohen et al. | Feb. 21, 1950 |
| 2,646,450 | Thurber | July 21, 1953 |

OTHER REFERENCES

Egloff: Reactions of Pure Hydrocarbons, Reinhold Publishing Corp., N.Y., 1937, pp. 585–590 relied on.